United States Patent [19]
Sayette

[11] Patent Number: 5,620,191
[45] Date of Patent: Apr. 15, 1997

[54] MULTIPLE PURPOSE SLED

[76] Inventor: Edward E. Sayette, 29 Junard Dr., Morristown, N.J. 07960

[21] Appl. No.: 385,892
[22] Filed: Feb. 9, 1995
[51] Int. Cl.⁶ ................................................. B62B 13/18
[52] U.S. Cl. .............................. 280/13; 280/8; 280/47.35
[58] Field of Search ............................ 280/8, 10, 11, 280/12.11, 13, 43.11, 43.14, 43.24, 47.16, 47.34, 47.35, 62, 30, 32

[56] References Cited

U.S. PATENT DOCUMENTS

| 2,491,318 | 12/1949 | Knapp | 280/32 |
|---|---|---|---|
| 2,926,021 | 2/1960 | Altadonna | 280/11 |
| 4,863,075 | 9/1989 | Romer | 280/8 |
| 5,092,615 | 3/1992 | Gregalis | 280/8 |
| 5,222,748 | 6/1993 | Johnson | 280/8 |
| 5,425,545 | 6/1995 | McCusker | 280/47.35 |
| 5,464,237 | 11/1995 | Saporiti | 280/11 |
| 5,465,996 | 11/1995 | Wisz | 280/47.34 |

Primary Examiner—Richard M. Camby
Assistant Examiner—Frank Vanaman
Attorney, Agent, or Firm—Ernest D. Buff

[57] ABSTRACT

A sled for moving a plurality of objects, such as beach equipment, over varied terrain having soft and hard surfaces such as sand, mud, snow, concrete, brick, cobblestone and asphalt. Advantageously, the sled is adapted to serve as a table, and is provided with holes for receiving the beach umbrella and for cups or drinking glasses. A plurality of holding tubes, sized to fit within the holes, receive and vertically support fishing rods, as well as garden implements and the like.

8 Claims, 9 Drawing Sheets

MULTIPLE PURPOSE SLED

BACKGROUND OF THE INVENTION

1. Field of the Invention

The present invention relates to a vehicle for moving objects, such as beach equipment, over varied terrain comprised of soft and hard surfaces, such as sand, grass, asphalt and the like. In one aspect, the vehicle is adapted to serve as a table provided with holes for receiving the beach umbrella and for cups; in other aspects, the vehicle is equipped with holders for fishing rods or garden implements.

2. Description of the Prior Art

Excursions to the beach require the transport of a large amount of paraphernalia, such as a beach umbrella, cooler, towels, blankets, chairs, etc. This is especially true for families with small children. Similarly, fishermen oftentimes require poles, coolers, tackle boxes, chairs, radio, etc. When visiting the beach from a motor vehicle, space is usually at a premium and devices that require assembly and disassembly place an added burden on the event. During visits at the beach, eating on a blanket can be difficult and wind causes added problems by dislodging or overturning drinking cups.

For transporting across sand, Zawislak, U.S. Pat. No. 3,927,814, discloses a cart having a "U"-shaded section of metal fitted with wheels. The user holds the vehicle at the appropriate angle to allow the wheels or the metal skid to contact the surface depending on the surface type. Resnick, U.S. Pat. No. 4,618,157 discloses a utility hand cart with skis attached to the base, where the cart is locked to skis for transport across sand.

Johnson, U.S. Pat. No. 5,222,748, discloses a wheeled beach sled kit adapted for intermittent assemblage and disassemblage into a sled for pulling paraphernalia alternately on sand and pavement. The vehicle has four fixed wheels which does not allow for easy turning. It has a large number of parts and, due to its kit form, has a flexible holding area which makes it inappropriate for moving heavy objects, such as a cooler, or sharp objects, such as a beach umbrella or chairs.

Needed is a vehicle for moving objects, such as beach equipment, over varied terrain composed of soft and hard surfaces, such as sand, snow, grass and asphalt. Additionally, the vehicle should be adapted to serve as a table and have holes for cups, as well as holders for fishing poles, garden implements and the like. The vehicle should be rugged, compact, lightweight, inexpensive and require no assembly.

SUMMARY OF THE INVENTION

The present invention relates to a sled for moving objects, such as beach equipment, over varied terrain composed of soft and hard surfaces, such as sand, snow, grass and asphalt. Additionally, the sled is adapted to serve as a table provided with holes for receiving the beach umbrella and cups, as well as holders for fishing rods, garden implements and the like.

Specifically, the invention provides a sled for transporting objects over soft or hard surfaces comprising: a carrying platform; first and second skids, the skids being parallel to the length of the carrying platform; and first and second wheels. Each of the wheels is positioned near one end of the carrying platform and extends below the first and second skids by a predetermined distance, whereby the first and second wheels support the carrying platform when the sled is traversing a hard surface such as asphalt, and the first and second skids support the sled when it is traversing a soft surface such as sand, mud, or snow.

Preferably, the sled further comprises a third wheel positioned near the opposite end of the carrying platform from the first and second wheels, the third wheel swivels about an axis perpendicular to the carrying platform and extends below the first and second skids. In this manner, the third wheel provides the sled with stability and ability to turn on hard surfaces. As a further preference, the third wheel is removable from the sled thereby reducing drag on the soft surface.

Further the sled comprises a hole in the carrying platform for receiving the pole of a beach umbrella, whereby the sled functions as a table on the sand with the umbrella providing shade. As a further preference, the sled is provided with at least one utility tube, and preferably a pair thereof, sized to fit within a hole in the carrying platform. The utility tube is adapted to receive a fishing pole, which is held vertically by the tube. Upon removal of the utility tube, the hole can be used for receipt of a cup or drinking glass. The sled can comprise a holding means adapted to accommodate additional tubes for holding garden implements such as trowels, claws, weeders and the like.

BRIEF DESCRIPTION OF THE DRAWINGS

The invention will be more fully understood and further advantages will become apparent when reference is had to the following detailed description of the preferred embodiment of the invention and the accompanying drawings, in which.

DESCRIPTION OF THE PREFERRED EMBODIMENTS

Excursions to the beach require the transportation of various sizes and shapes of equipment. This equipment can include a beach umbrella, cooler, chairs, blankets, toys, books, lotions, fishing rods and accessories, baby cribs, etc. A conventional wheeled vehicle, while adequate for transporting this equipment on smooth, paved surfaces, is useless on soft surfaces such as sand. Existing devices for transporting equipment at the beach serve no other function. The sled described here is provided with means for holding fishing rods and a means for holding drinks, and provides an eating surface.

Referring to the drawings, the present invention provides a sled 10 for transporting objects over soft or hard surfaces comprising: a carrying platform 12; a first skid 14 and second skid 16. The skids, 14, 16 are parallel to the length of the carrying platform 12. Sled 10 has a first wheel 20 and a second wheel 22. Each of the wheels 20,22 is positioned near one end of the carrying platform and extends below the first skid 14 and second skid 16 by a predetermined distance. In this manner, the first and second wheels 20,22 support the carrying platform 12 when the sled 10 is traversing a hard, smooth surface such as asphalt, and the first and second skids 14, 16 support the sled 10 when it is traversing a soft surface such as sand, mud, or snow. First wheel 20 and second wheel 22 are connected by fixed axle 21. Rope 11 is used to pull sled 10.

Figure 1:
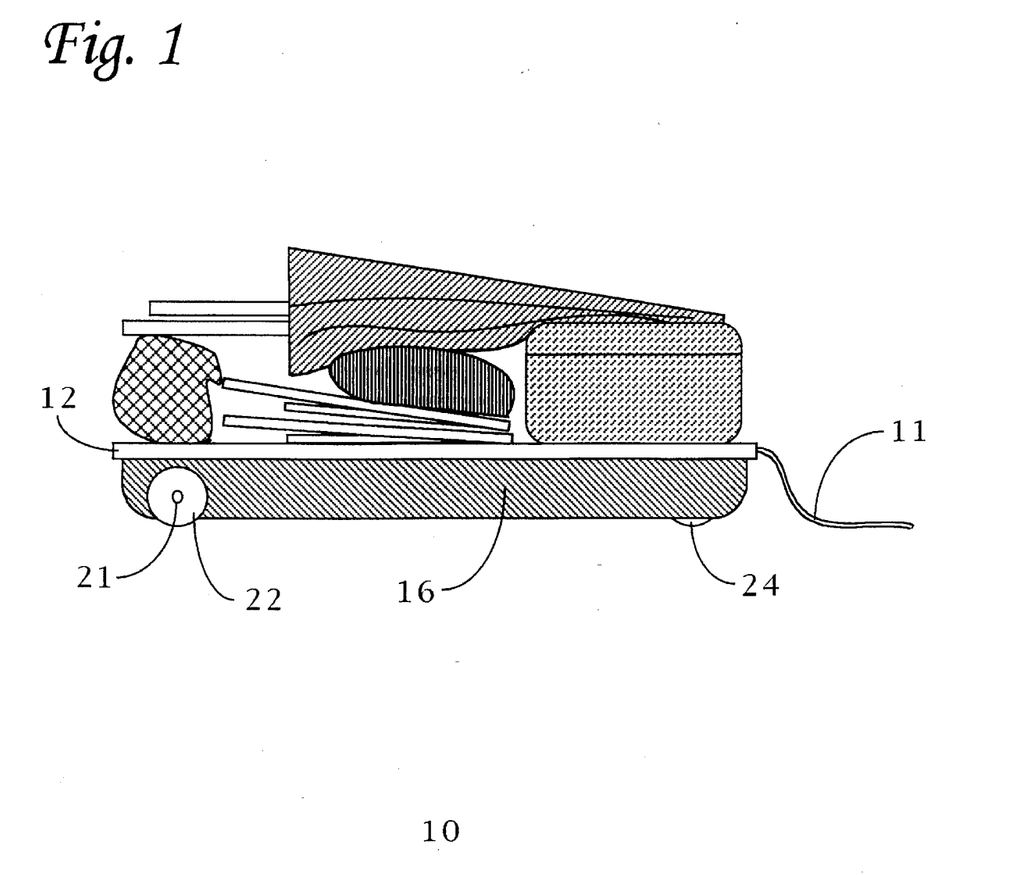
FIG. 1 is a side view of the multiple purpose sled of the present invention loaded with equipment for transport.
Figure 2:
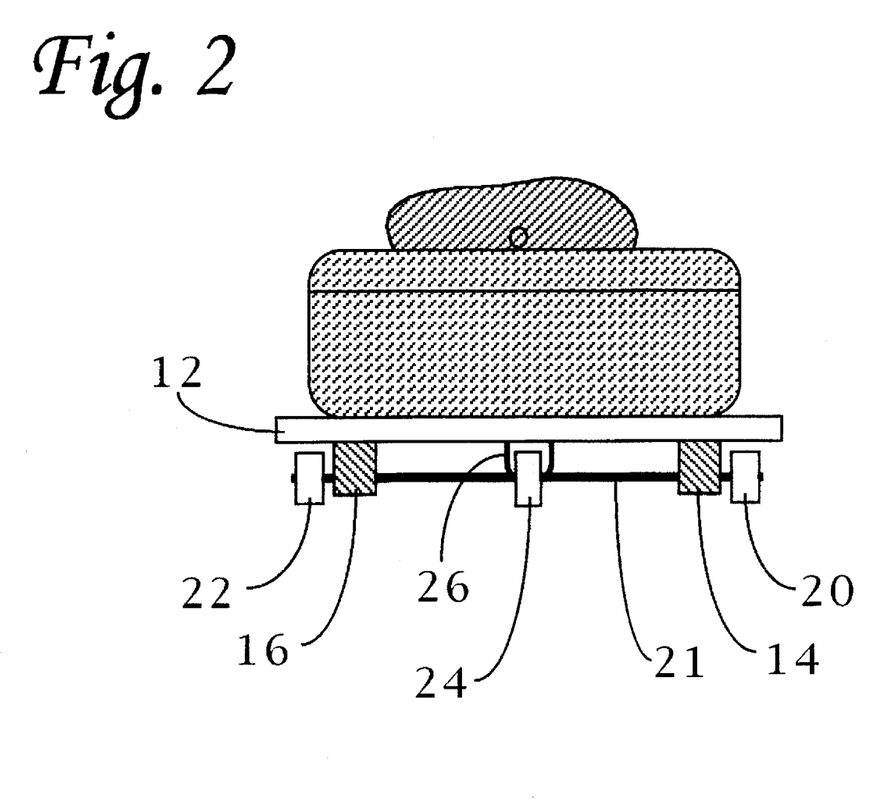
FIG. 2 is a front view of the sled shown in FIG. 1.
Figure 3:
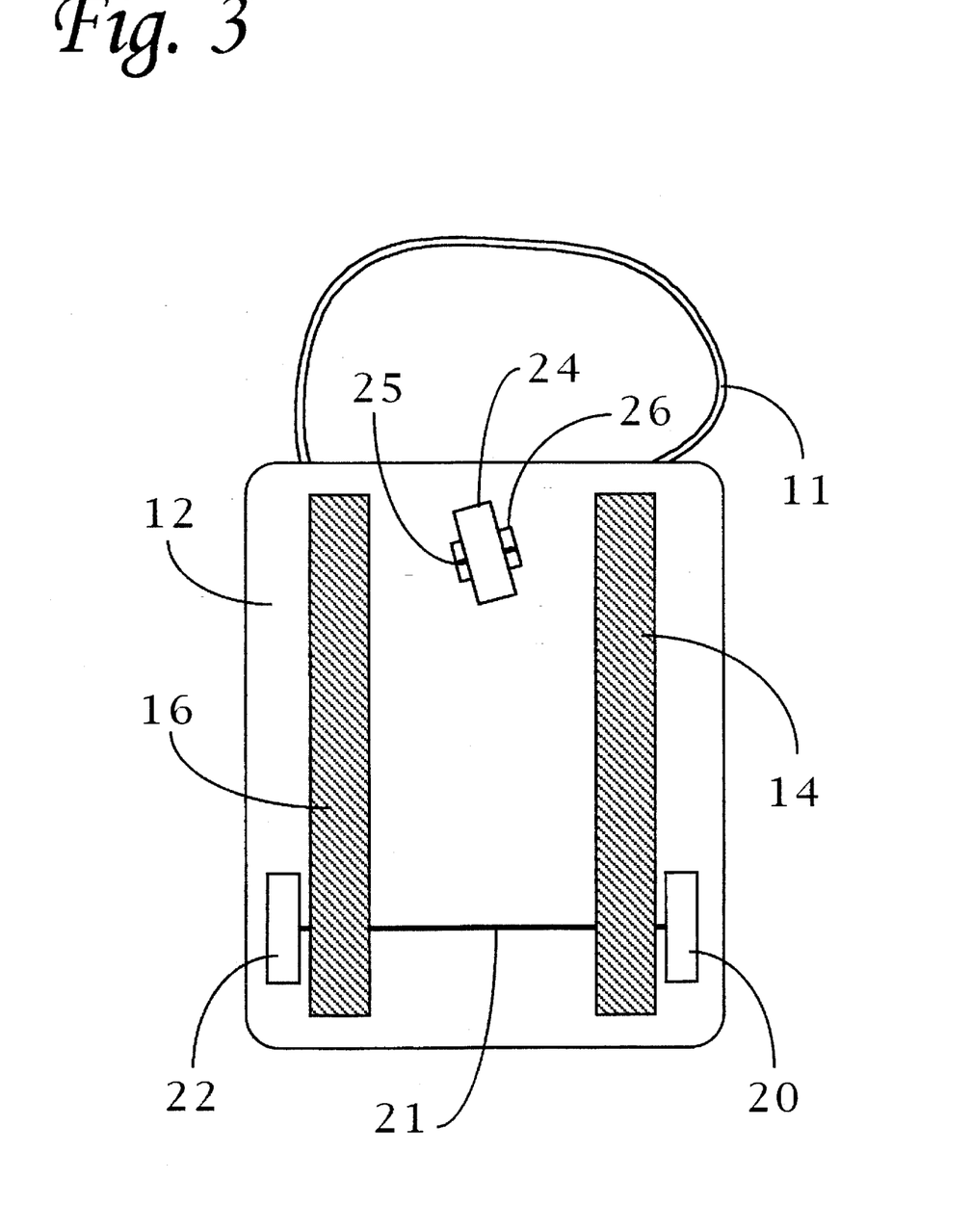
FIG. 3 is a view of the underneath of the sled shown in FIG. 1.

Preferably, as shown in FIGS. 1, 2 and 3, the sled 10, shown generally at 10, further comprises a third wheel 24 having an axle 25 mounted on swivel 26. Swivel 26 provides wheel 24 with a means for turning wheel 24 about an axis perpendicular to axle 25. Optionally, third wheel 24, its axle 25 and mounting swivel 26 are removable, facilitating movement of sled 10 through sand.

Platform 12 is preferably comprised of molded plastic or fiberglass. Similarly, first skid 14 and second skid 16 are preferably comprised of molded plastic or fiberglass.

Figure 4:
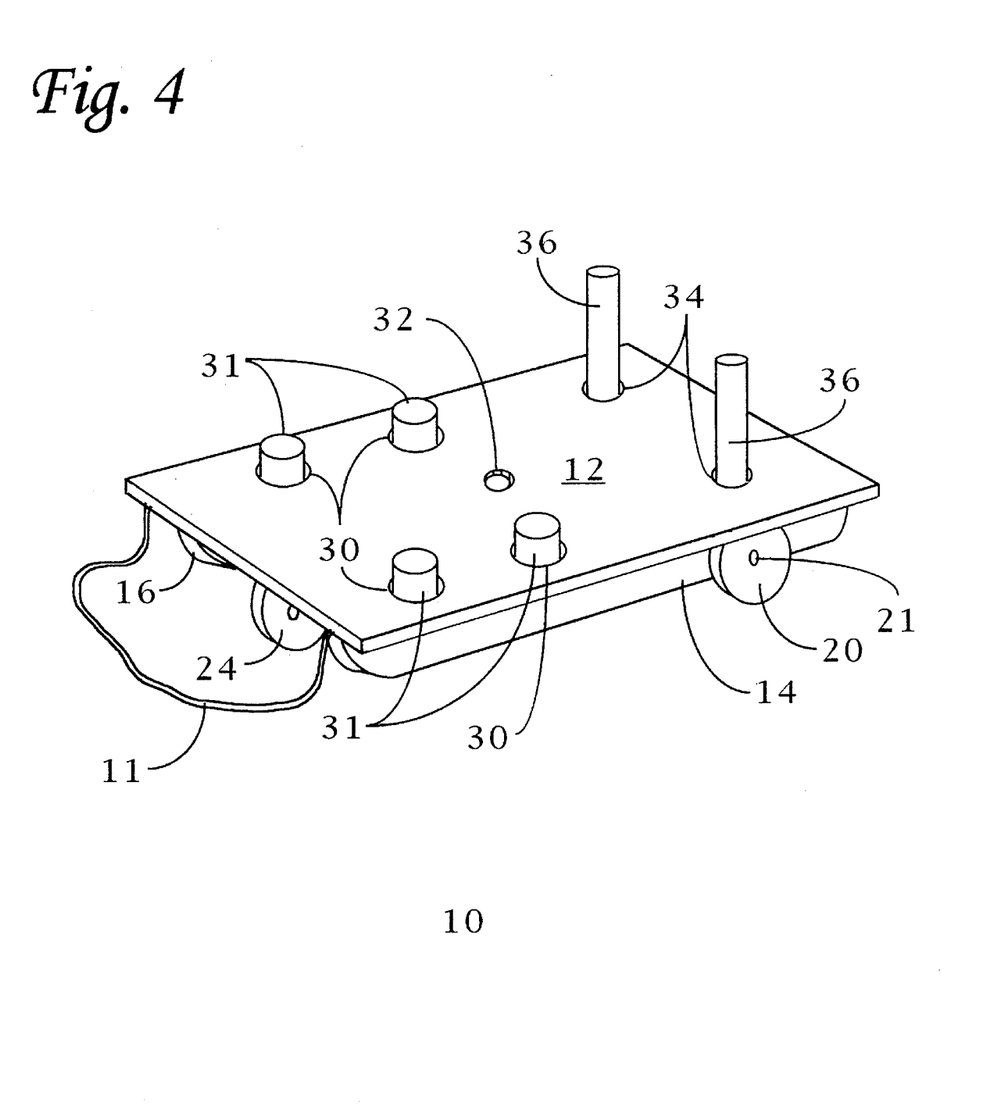
FIG. 4 is a perspective view of the sled functioning as a table and holding drinking glasses.
Figure 5:
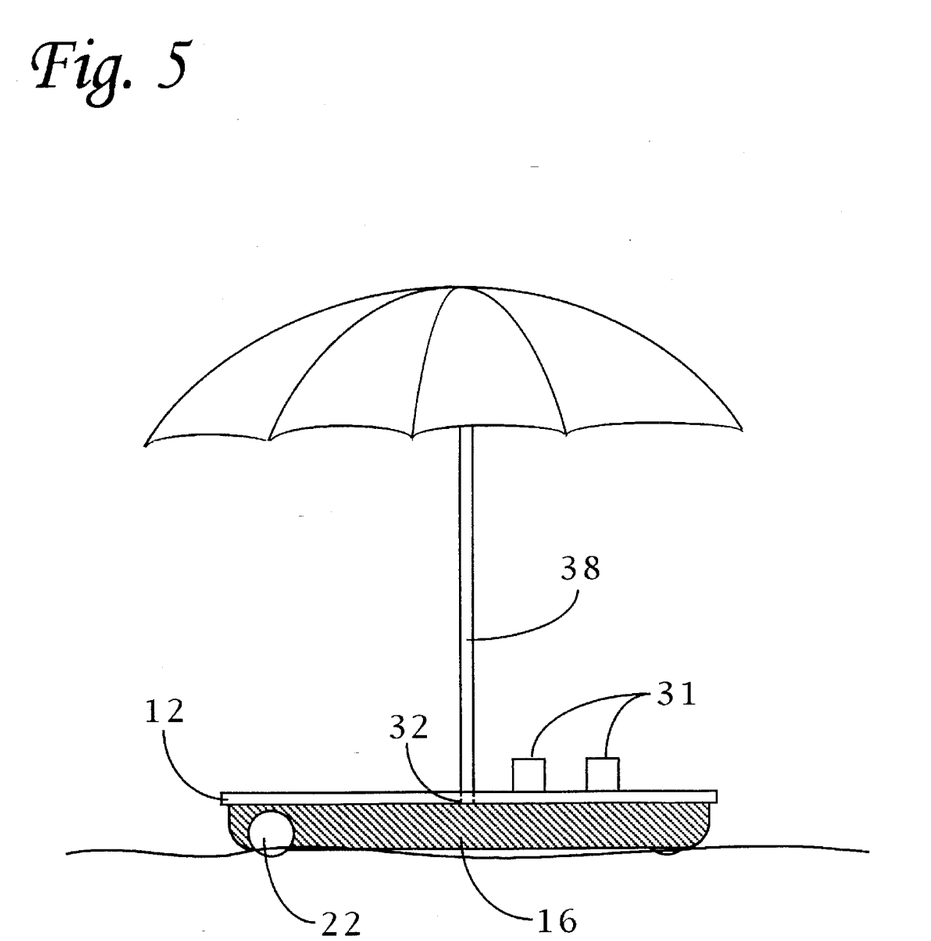
FIG. 5 is a side view of the sled functioning as a table and fitted with a beach umbrella.
Figure 6:
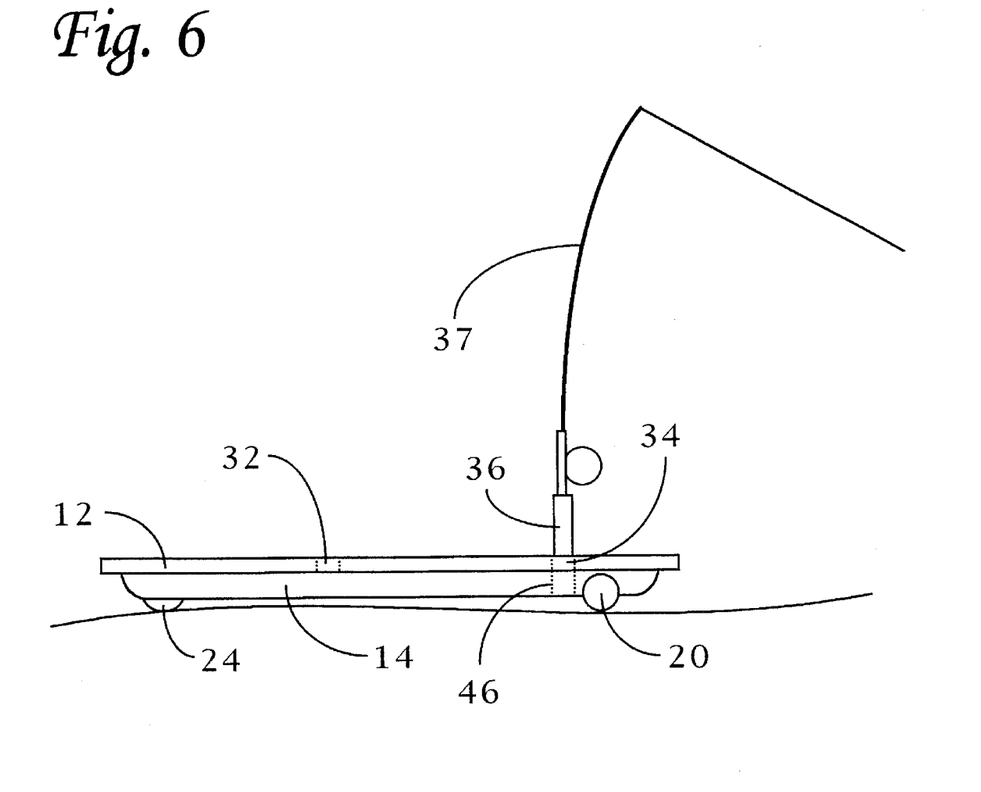
FIG. 6 is a side view of the sled holding a fishing rod.
Figure 7A:
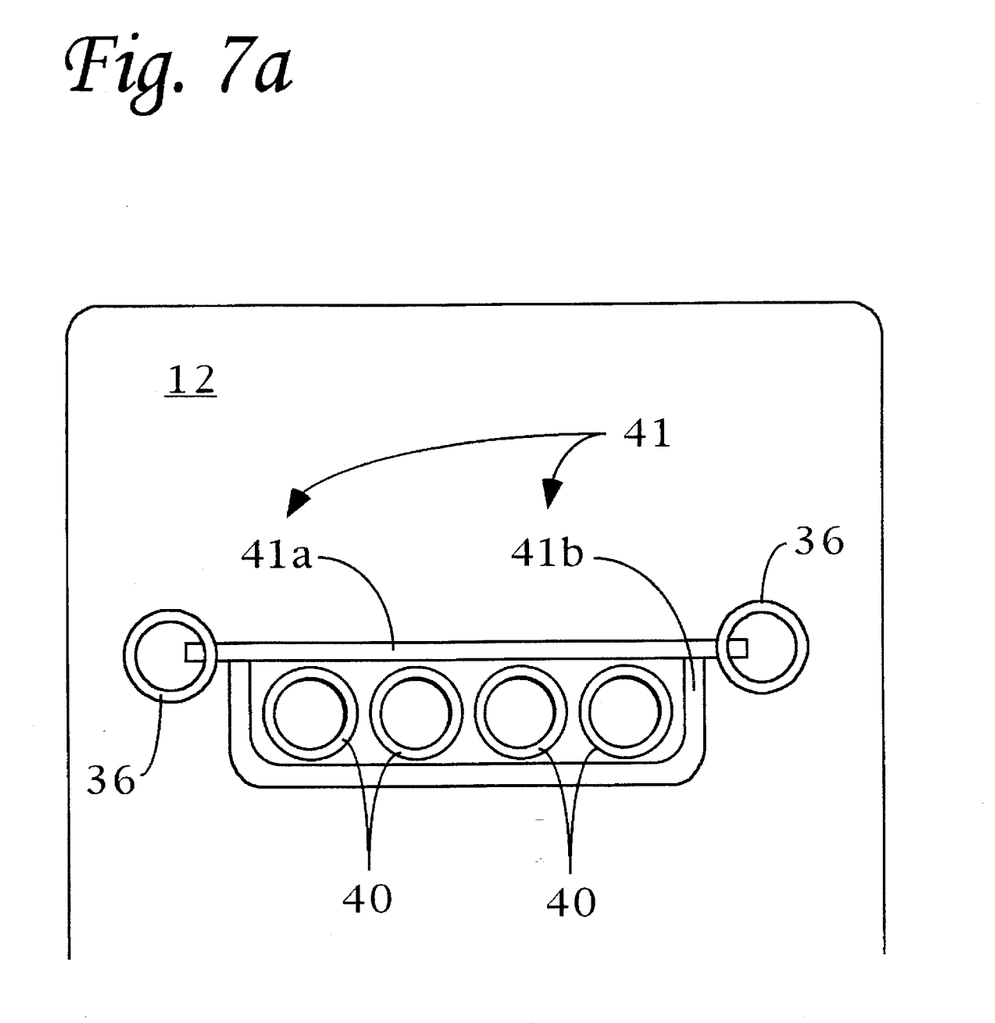
FIGS. 7a, 7b and 7c are plan, front elevation and side views, respectively, of a portion of a sled provided with a holding means for holding garden implements.
Figure 7B:
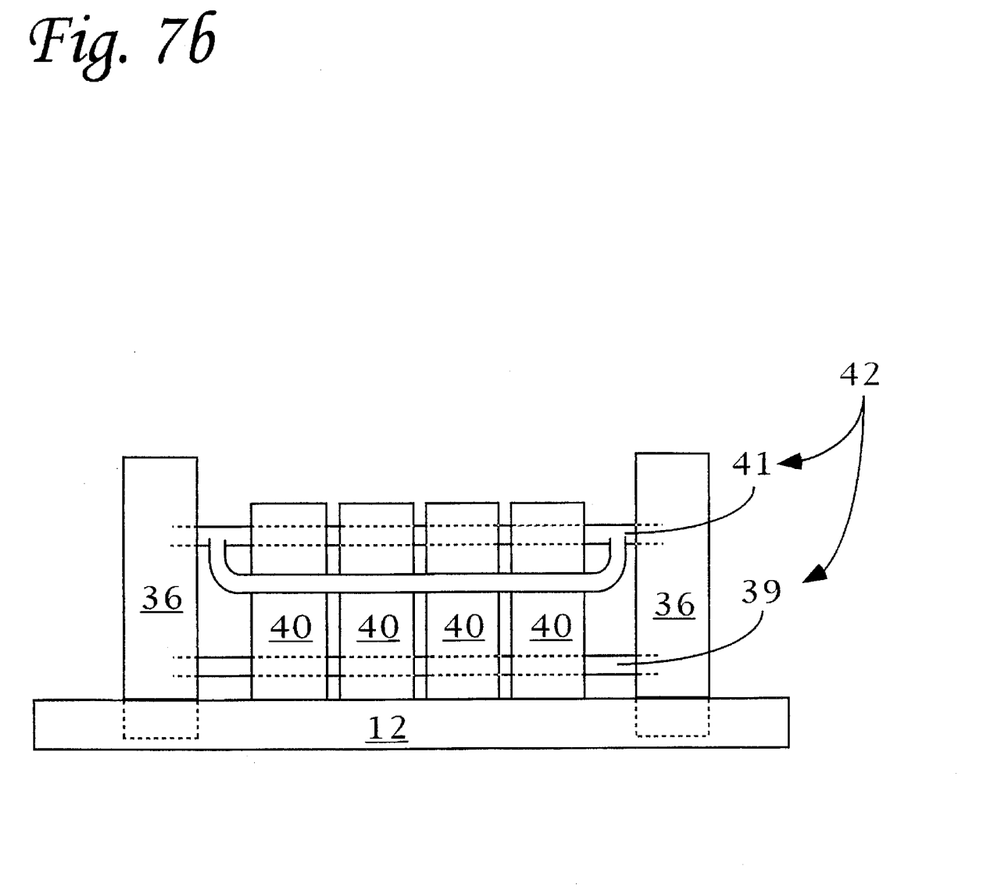
Figure 7C:
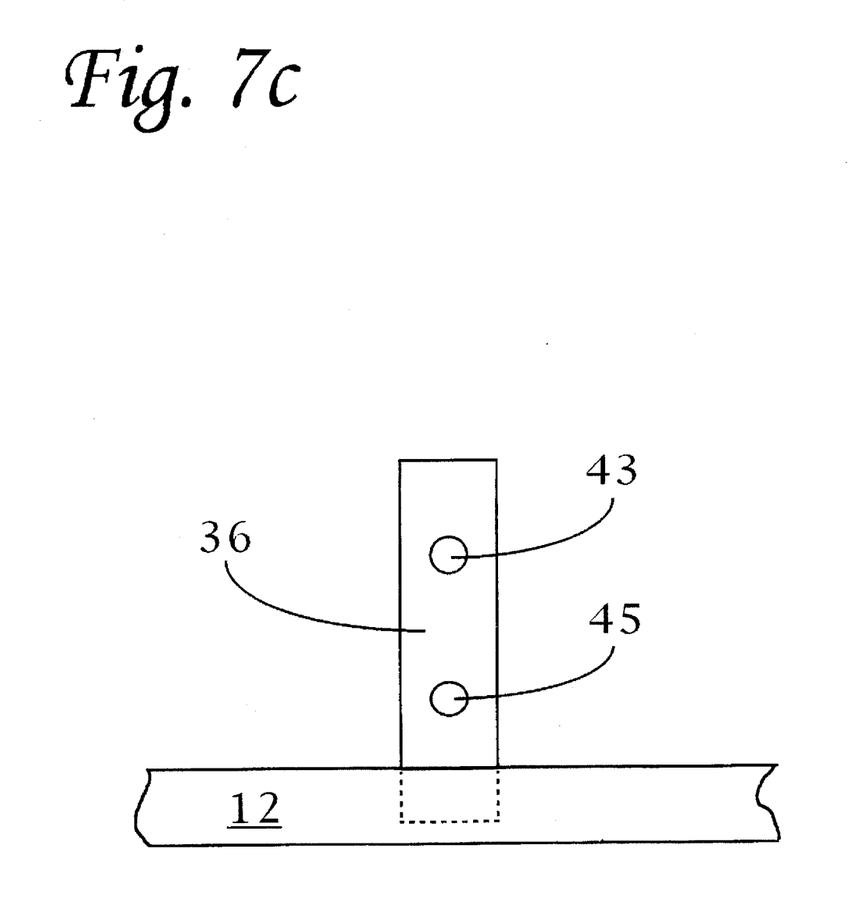

Optionally, as shown in FIG. 4, platform 12 is provided with one or more holes 30 for receiving drinking glasses 31. Additional options are depicted by FIGS. 5, 6, and 7. In FIG. 5, there is shown a platform 12 provided with hole 32 for a receiving beach umbrella 38. In FIG. 6, the platform 12 is provided with one or more holes 34 for receiving utility tubes 36. Holes 34 are located above first and second skids 14 and 16, and extend through the carrying platform so as to be concentric with schematically shown molded indents 46 in the skids. Each of the utility tubes 36 is sized to receive a fishing pole 37. FIGS. 7a, 7b, and 7c illustrate means, shown generally at 42, for securing additional tubes 40 of various lengths to the sled 10. Tubes 40 are fixedly positioned on platform 12 and held thereon by tubular holders 39 and 41 of which the assembly 42 is comprised. Tubular holder 41 is comprised of tube 41a and "U" shaped tube 41b, as shown in FIG. 7a. Alternatively, a plurality of straight tubes and "T" connectors (not shown) can be utilized to form tube 41b. Holders 39 and 41 are connected to utility tubes 36 through holes 43 and 45, respectively. Tubular holder 41 is pivotally connected to holes 43 and is constructed to provide therein an opening through which tubes 40 are inserted. The pivotal feature of tubular holder 41 facilitates placement of tubes 40 and, in combination with tubular holder 39, provides a three point holding assembly which stations the tubes 40 securely on platform 12 of sled 10.

Having thus described the invention in rather full detail, it will be understood that such detail need not be strictly adhered to but that further changes and modifications may suggest themselves to one skilled in the art all falling within the scope of the invention as defined by the subjoined claims.

What is claimed is:

1. A sled for transporting objects over varied terrain composed of soft or hard surfaces comprising:

(a) a carrying platform having at least one hole extending completely therethrough;

(b) first and second skids, said skids being parallel to the length of said carrying platform;

(c) first and second wheels, each of said wheels being positioned near one end of said carrying platform and extending below said first and second skids by a predetermined distance, whereby said first and second wheels support said end of said carrying platform when said sled is traversing said hard surfaces and said first and second skids support said sled during traversal thereof over said soft surfaces;

(d) a third wheel, said third wheel being positioned near the opposite end of said carrying platform from said first and second wheels, said third wheel being adapted to swivel on an axle about an axis perpendicular to said carrying platform and to extend below said first and second skids, each of said third wheel and said axle being removably mounted on said sled, whereby said third wheel stabilizes said sled and, together with said first and second wheels, establishes a plane below said skids so that said first, second and third wheels support said sled during traversal thereof over hard surfaces, said third wheel enabling said sled to turn easily on said hard surfaces and, when removed, reducing drag and facilitating movement of said sled over said soft surfaces;

(e) said carrying platform having at least one additional hole provided above said first and second skids, said additional hole extending through said carrying platform and being concentric with a molded indent in the skids; and (f) said sled further comprising a utility tube, said tube being sized to fit within said additional hole and to receive a fishing pole, said molded indent providing a firm vehicle support to the utility tube and said fishing pole being held substantially vertically by said tube.

2. A sled as recited by claim 1, wherein said at least one hole is adapted to receive the pole of a beach umbrella, so that, when placed on soft sand, said sled functions as a table with said umbrella providing shade.

3. A sled as recited by claim 1, wherein said additional hole is adapted to receive a cup or drinking glass when said utility tube is removed.

4. A sled as recited by claim 1, further comprising a holding means connected to said utility tube for holding on said carrying platform at least one additional utility tube.

5. A sled as recited by claim 1, having a plurality of additional holes and a plurality of utility tubes sized to fit therein.

6. A sled as recited by claim 5, wherein said sled has a pair of said utility tubes and further comprises a holding means connected to said utility tubes for holding on said carrying platform at least one additional utility tube.

7. A sled as recited by claim 6, wherein said holding means is adapted to hold a plurality of additional utility tubes.

8. A sled as recited by claim 7, wherein said holding means is adapted to hold three additional utility tubes.

* * * * *